United States Patent

[11] 3,593,176

[72] Inventor Richard W. VanSaun
Edmonds, Wash.
[21] Appl. No. 815,703
[22] Filed Apr. 14, 1969
[45] Patented July 13, 1971
[73] Assignee John Fluke Mfg. Co., Inc.
Snohomish County, Wash.
Continuation-in-part of application Ser. No. 595,981, Nov. 21, 1966, now Patent No. 3,491,295.

[54] ERROR SIGNAL SENSING SYSTEM USING VARIABLE FREQUENCY OSCILLATOR AND UP/DOWN COUNTER
5 Claims, 3 Drawing Figs.

[52] U.S. Cl. .......... 330/137, 325/407, 331/18
[51] Int. Cl. .......... H03g 3/20
[50] Field of Search .......... 330/137; 331/18; 325/407

[56] References Cited
UNITED STATES PATENTS

| | | | |
|---|---|---|---|
| 3,265,986 | 8/1966 | Wyckoff .......... | 331/18 X |
| 3,378,786 | 4/1968 | Andrea .......... | 330/137 |

*Primary Examiner*—Roy Lake
*Assistant Examiner*—Siegfried H. Grimm
*Attorney*—Christensen, Sanborn & Matthews

ABSTRACT: A feedback and control system for adjusting the gain of an amplifier associated with an input circuit so that such adjustment will automatically reduce the error between a standard signal and an input signal. The adjustment required then provides an indication of a given value of the input signal with substantially no load being imposed on the source providing the input signal. A voltage controlled oscillator responsive to error signals generated when the output of the amplifier is compared to a known standard signal is utilized in the feedback circuit in combination with an up/down counter. The system of the preferred embodiment operates to correct the error signal at a rate proportional to the error. Details of an R.M.S. meter incorporating the present invention are provided.

INVENTOR.
RICHARD W. VAN SAUN
BY
Christensen Sanborn & Matthews
ATTORNEYS

INVENTOR.
RICHARD W. VAN SAUN
BY
Christensen, Sanborn, & Matthews
ATTORNEYS

ERROR SIGNAL SENSING SYSTEM USING VARIABLE FREQUENCY OSCILLATOR AND UP/DOWN COUNTER

This application is a continuation-in-part of U.S. application Ser. No. 595,981, and now U.S. Pat. No. 3,491,295, titled "R.M.S. Instrument Having Voltage Controlled Oscillator in Feedback Loop" filed on Nov. 21, 1966 in the name of the present inventor and assigned to the present assignee.

Various types of measuring devices for determining the root-mean-square value of an applied voltage have been devised. One technique which has been utilized is that which includes the use of a variable gain amplifier disposed between the indicating circuitry and the input circuit with adjustment of the gain being made by an operator until a null condition is achieved. The feedback or gain adjustment of the amplifier is then proportional to the input signal and hence is utilized as a measure of the input voltage. It would be advantageous in these and other error detecting and correcting systems to have the capability of automatic gain adjustment and readout with the rate of change of gain adjustment being proportional to the gain adjustment to be made.

It is therefore an object of the present invention to provide a novel feedback circuit for adjusting the gain of a variable gain amplifier. Another object is to provide in such a system means for simultaneously adjusting a digital voltage indicator.

Another object of the present invention is to provide a variable gain amplifier and feedback circuitry associated therewith for automatically adjusting the gain of the amplifier and wherein the output signals from the amplifier are adjusted by the feedback network until the output signal from the amplifier is exactly equal to a known standard.

An additional object of the present invention is to provide a variable gain amplifier with a feedback circuit for adjusting the gain thereof which includes a variable frequency oscillator, an up/down counter, and a control circuit for the counter for determining whether the counter should count up or down for adjustment of the amplifier.

Another object of the present invention is to provide a variable gain amplifier and suitable feedback network for adjusting the gain thereof to bring the output from the amplifier to a level corresponding to that of a known standard and wherein the feedback signals serve to adjust a digital voltage indicating device.

The above as well as additional advantages achieved in accordance with the teachings of the present invention are used in proving the novel R.M.S. instrument of the above-referenced patent application. A variable gain amplifier is disclosed as having an unknown signal applied as an input thereto with the output signal from the amplifier serving to energize a first thermocouple which is in series opposition with a second thermocouple having a standard known current passing therethrough. The gain of the amplifier is adjusted until a null condition is achieved between the two thermocouples, thus indicating that the output signal from the amplifier is exactly equal to the known standard current passing through the second thermocouple. When this condition is achieved the gain adjustment of the amplifier required to reach the null condition is a direct indication of the R.M.S. value of the input signal.

One of the reasons for nonuse of thermocouple devices in systems of this general type in the past is that most people have considered the same to be too slow acting to provide the desired rapid voltage indication. However, in the system of the present invention the feedback circuit for adjusting the gain of the amplifier responds not only to a difference in the output signals from the two thermocouples, but also operates to adjust the amplifier gain at a rate which is proportional to the difference in the signals from the thermocouples. Therefore when a large gain adjustment is to be accomplished the feedback circuit operates very rapidly by providing rapid control of digital resistor banks which respond to the amplifier output difference signal from the thermocouples. In the specific embodiment illustrated herein a variable frequency voltage controlled oscillator is utilized for adjusting the digital resistor banks in the amplifier feedback network. Suitable counter units are connected between the feedback resistors and the variable frequency oscillator, with a digital voltage indicator being coupled with the counting network to provide an automatic digital indication of the attenuation adjustment and hence a direct indication of the R.M.S. value of the input signal.

It has been found in practice that the last digit in the multidigit indicator tends to undergo recurring alternations since the circuitry must choose between two discrete numbers. In the system of the present invention a timing control network is coupled with the counter circuitry and digital indicator so that the indication of the voltage is sampled only at periodic intervals. A precounter and feedback circuit controlled thereby serves to reduce alternations of the lowest indicated digit.

Figure 1:
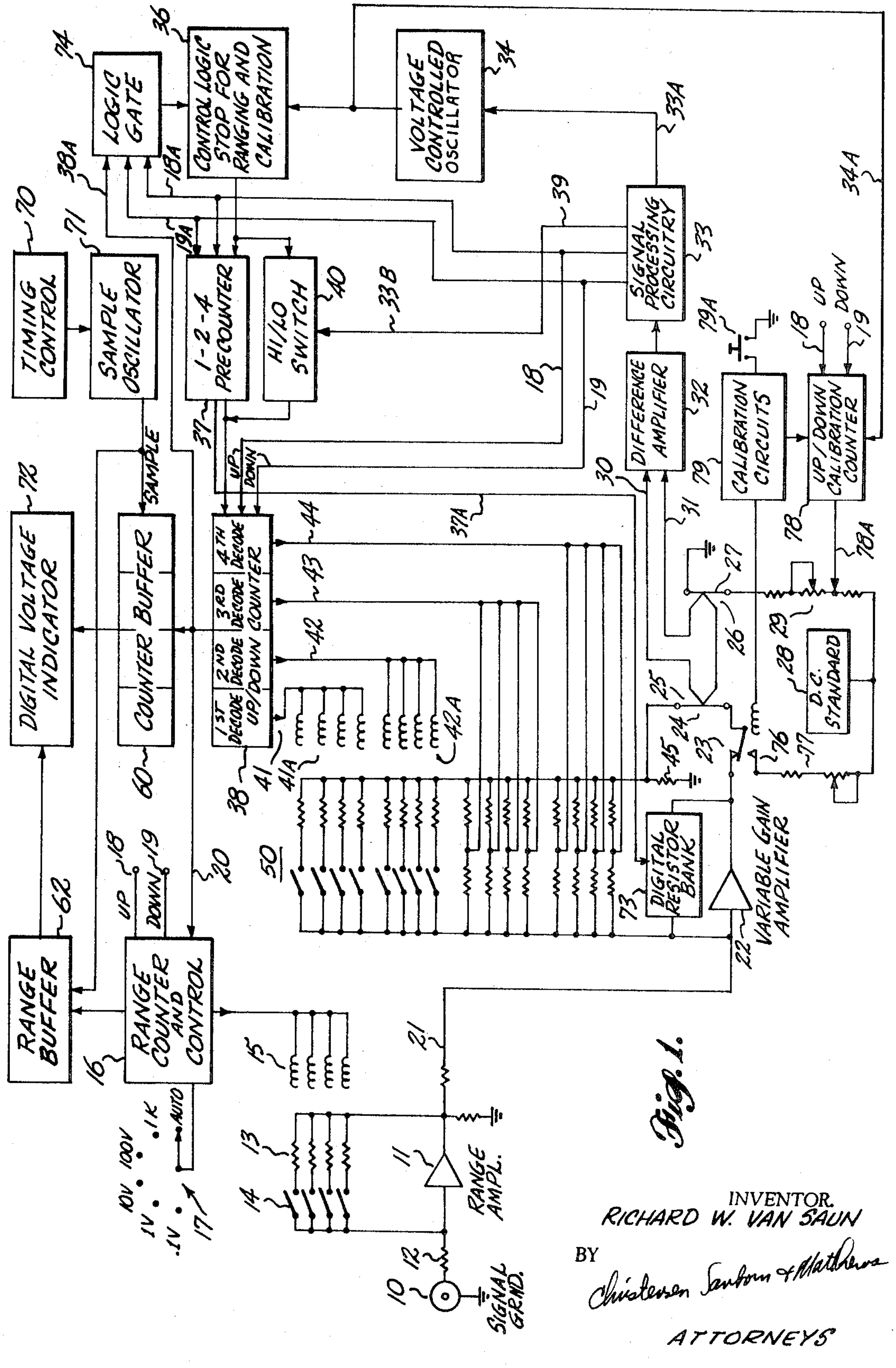
FIG. 1 is a block diagram of a preferred embodiment of the present invention as incorporated in an R.M.S. meter.

Referring now to the drawings and in particular to FIG. 1 the system is shown as measuring the R.M.S. value of the voltage from a signal source 10 having its signal output circuit connected directly to a first variable gain range amplifier 11 through an input resistance 12. A set of range resistors 13 each having an associated switch 14 are adapted for insertion in the feedback circuit for the range amplifier 11 in accordance with the energization state of an associated relay winding 15. The degree of attenuation for the range amplifier 11 is determined by the range counter and control 16 which has a manual adjustment control 17. One position of control 17 is shown as being "auto" to signify that the adjustment of the range control is made automatically by the system in the manner described hereinafter. For this purpose the range control 16 has a pair of signal input terminals 18 and 19 respectively denoted as "up" and "down" and a counter circuit 20 connected thereto.

The output circuit from the amplifier 11 is coupled to the input of a variable gain amplifier 22. The output circuit of the variable gain amplifier 22 is connected by a first set of contacts 23 to a heater element 24 which is part of a first thermocouple 25 connected in a balanced bridge arrangement with a second standardizing thermocouple assembly 26. The assembly 26 includes a second heater element 27 which is connected directly in circuit with a known source of current shown as a DC standard 28. An adjustable impedance element shown as a variable resistor 29 is connected in circuit between the DC standard source 28 and the heater element 27.

The thermocouples 25 and 26 are connected in series opposition with the output leads 30 and 31 thereof being connected to a high sensitivity and low drift difference amplifier 32. The amplifier 32 amplifies the difference between the output signals from the thermocouples and provides an input signal to the signal processing circuitry shown generally at 33. The circuitry 33 operates on the input signals thereto and provides an output signal on lead 33A which is proportional to the absolute value of the difference between the output signals from the two thermocouples. The variable frequency voltage controlled oscillator 34 connected to lead 33A responds to such signals to provide an output signal the frequency of which is controlled by the thermocouple output signals. It should be noted that since the signals from the circuitry 33 represent the absolute value of the difference between the thermocouple output signals the frequency of the V.C.O. increases regardless of whether the signal from the thermocouple 25 is too high or too low.

Variable frequency controlled oscillators whose output frequency is a function of the input voltage (i.e. $f_{vco}=Bf(E)$ where $E$ is the input voltage and $f(E)$ increases as $E$ increases) are per se well known in the art and thus the details thereof are not included. Such oscillators typically use a variable impedance element such as a Varicap in the input circuit for controlling the frequency of the output signals. The frequency in such oscillators is typically a function of a variable exponential power of the input voltage (i.e. $f=E^x$ where $E$ is the input voltage and $x$ is a variable that increases with $E$). The particular relationship between frequency and amplitude of input signal can be selected in accordance with the desired system performance with standard controlled oscillators being available to carry out the desired object. In the specific embodiment illustrated herein where the amplifier control system is used in an R.M.S. meter the V.C.O. is advantageously selected to have an output signal frequency which is linearly related to amplitude of the input voltage in order to simplify analysis of the control loop. In one system a conventional multivibrator was used as the V.C.O. with the current for recharging the timing capacitor for the normally "off" side having been proportional to the input voltage.

The output circuit of the voltage controlled oscillator is connected through a control logic network 36 and precounter 37 to a four decade "up-down" counter 38. The frequency of the V.C.O. always increases in response to an increase in the error signal of amplifier 32 and therefore the signal processing circuitry provides "count up" or "count down" control signals via leads 18 and 19 to the counter 38 (and also to the range control 16). The signal processing circuitry also provides an output signal on lead 33B to a "Hi-Lo" switch 40 connected in parallel with the precounter 37.

The decade counter 38 is shown as having four digital orders or counting sections in series. Each section is a four-stage binary counter and thus the output lines 41—44 for each stage includes four separate lines for controlling selected ones of the resistors in the digital resistance bank 50 by means of the solenoids or relay windings 41A, 42A and corresponding controls included in the decade counters 43 and 44 (not illustrated). The specific details of the decade resistance bank can vary and are per se well known in the art. The important thing to be noted from FIG. 1 is that each of the resistors in the digital resistance bank 50 is connectable from the output circuit to the input circuit of the variable gain amplifier 22 with the output circuit of the variable gain amplifier further being connected to signal ground by a resistor 45. In the system of FIG. 1 the thermocouple 25 provides an output signal proportional to the heating effect of the current applied thereto. Therefore when the magnitude of this heating current is made exactly equal to the heating current for the standard thermocouple 26 it will be seen that the setting of the decade counter 38 represents the digital value of the voltage (R.M.S.) of the signal applied to the variable gain amplifier.

The signal processing circuitry 33 provides an output signal on lead 33A which increases in magnitude regardless of the direction in which the difference signal applied thereto changes. As the signal from the amplifier 32 increases in magnitude the frequency of the oscillator 34 increases with the frequency being proportional to the magnitude of the difference between the output signals from the first and second thermocouples. The control logic 36 responds to the output signals from the oscillator 34 to change the count of the decade counter 38 either up or down in accordance with the "up-down" signals on lines 18 and 19. The system operates in a digital mode in response to each cycle of the signal from the oscillator and thus it will be seen that the rate of increase (or decrease) of the setting of the counter 38 will be proportional to the frequency of the signals from the voltage controlled oscillator 34. The system therefore reacts very rapidly to a major difference between the output signal from the variable gain amplifier 22 and the standard signal from the thermocouple 26 to thereby cause rapid adjustment of the gain of amplifier 22. As the output signal from the amplifier 22 approaches the amplitude of the signal applied to the heater element 27 by the DC standard source 28, the rate of adjustment of the gain for the amplifier 22 decreases and hence overshoot and system oscillation are avoided.

As previously noted, the system includes means for automatically adjusting the range of the voltages indicated. To this end the system includes an output circuit 20 from the counter unit 38 to the range and counter control 16. The range counter and control 16 causes automatic adjustment of the resistors 13 whenever the count in the decade counter reaches a predetermined value described hereinafter. The range control 16 is coupled by buffer unit 62 to the indicator 72 for control of the decimal point in the indicators thereof. The direction in which the feedback resistance for the range amplifier 11 is to be adjusted is controlled by the up/down signals applied to the control 16 via leads 18 and 19.

The system is shown as including four digital orders in the counter. When reading voltages to this degree of accuracy with a system operating in a digital mode the last or lowest order digit thereof will tend to fluctuate between two values due primarily to internal "noise." To avoid the unpleasant condition of an operator viewing an indicator device having the numbers thereon rapidly changing, the system of the present invention includes a timing control 70 and sample oscillator 71 controlled thereby which serves to periodically operate the counter buffer gates 60 so that the output signals from the decade counter 38 will be periodically sampled and applied to the digital voltage indicator 72. The indicator 72 can conveniently be of the numerical indicating tube type. The timing control 70 can be set at any selected time interval so that the periodicity of the signal sampling will occur at such selected intervals.

The precounter 37 further serves to prevent undesired alternations of the lowest indicated digit. The precounter 37 is a three-stage binary counter and will be seen to have an output circuit 37A which is connected to a second digital resistor bank 73 connected in parallel with the variable gain amplifier 22. The resistors of the bank 73 are not associated with any indicated digit and thus even though the count in the precounter 37 changes the settings of the resistor bank 73 the same will not affect the indicator 72. The Hi/Lo switch 40 is closed when the output signal from difference amplifier 32 is greater than a predetermined value. When this occurs signals from the oscillator are applied directly to the counter 38. Then as system balance is approached the switch 40 opens and the precounter counts up or down in response to small difference signals from amplifier 32 activating the oscillator. In the embodiment illustrated the precounter 37 is a three-stage binary counter so coupled with the lowest order stage of counter 38 that an output count signal is applied to counter 38 only when the capacity of the precounter is exceeded. This means that the precounter counts up and down and adjusts the resistors 73 without affecting the indicator 72 until a count of eight is reached by the precounter. Thus the system is able to accommodate a selected amount of vacillation near the balance point. This permits the use of a voltage controlled oscillator which need not have a true zero output but can have a "zero level" such that the output thereof causes small "up" and "-down" adjustments of resistors 73 to be continually made without causing undesired indicator fluctuation. Thus a feedback loop is provided which in effect defines a finite hysteresis or zero level operating range for the V.C.O. 34 and the quantizing error inherent in digital systems is avoided.

A logic control gate 74 is connected to the control logic 36 and is provided with input circuits 18A, 19A, and 38A respectively from the signal processing circuitry and from counter 38. The gate serves to lock out any signals from the V.C.O. 34 to counter 38 when the counter stops on a count of 10,999 AND "countup" is indicated by line 18A, or when the counter stands at 0999 AND count down is indicated by line 19A. When this occurs "range up" or "range down" is required and counting is stopped until the range control 16 had adjusted the range resistors and indicator unit decimal points.

Figure 3:
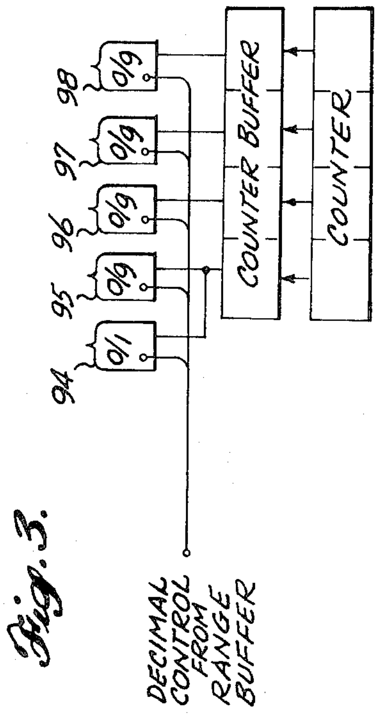
FIG. 3 is a block diagram of the counter and indicator portions of the system of FIG. 1.

As seen in FIG. 3 the counter 38 has four decades while the indicator 72 has five units 94—98 shown as indicator tubes having decimal indication controlled by the range control 16. The highest order indicator 94 as well as the indicator 95 adjacent thereto on the right is coupled with the highest order counting stage. Indicator 94 normally indicates 1 or is extinguished except that when the system is in the millivolt range it indicates zero. Thus the above statement regarding "10999 AND UP" refers to the indication provided by indicator 72. For example if the system indicated 10.999 volts and an "UP" signal were received, the system would "range up" to indicate "10.99"b with the indicator 74 being extinguished and the decimal moving to the right.

The system includes a calibration circuit for achieving initial zero setting and balancing of the thermocouples 25 and 26 automatically. The switch 23 coupled with the output circuit of the amplifier 22 has a second contact 76 which is used to place the heater 24 and resistors 77 in parallel circuit with the heater 27 and resistance 29. An up-down calibration counter 78 coupled with the calibration circuit control 79 is also coupled by lead 34A to the V.C.O. 34 output and by lead 78A to the resistors 29. When switch 79A is closed the up-down calibration counter acts as a variable load and responds to signals from the V.C.O. 34 to adjust the current flow through heater 27 in a direction to equalize the signals applied to difference amplifier 32. When the system has been thus calibrated the load applied by the calibration counter remains fixed.

Figure 2:
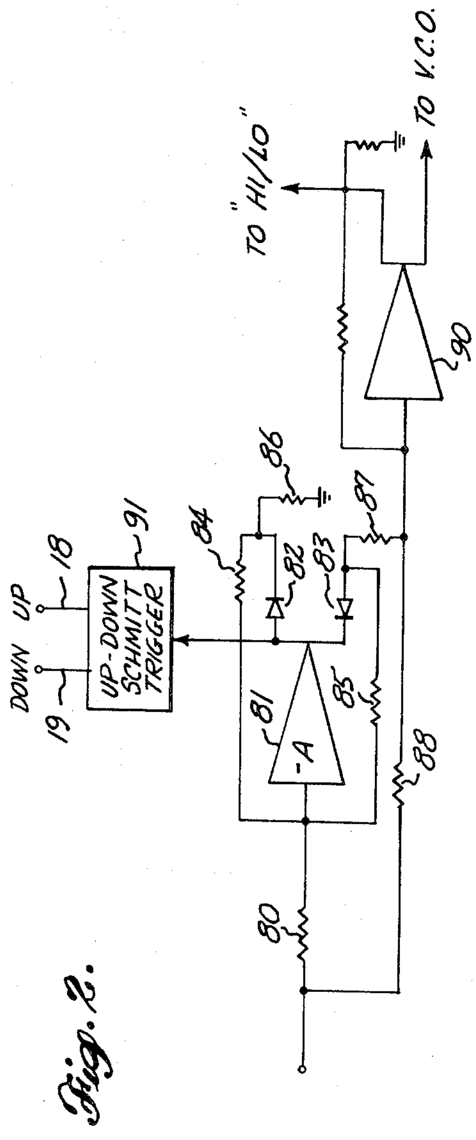
FIG. 2 is a block diagram of the components of one arrangement of parts of the signal processing circuitry in the system of FIG. 1.

Referring now to FIG. 2 the details of one preferred embodiment of the components used in the signal processing circuitry 33 of FIG. 1 will be described. The output signals from the difference amplifier 32 are applied via resistor 80 to an inverting amplifier 81 which has its output circuit coupled by the oppositely poled diodes 82 and 83 and resistors 84 and 85 to its input circuit. The diode 82 is grounded through resistor 86 while the diode 83 is further coupled with the input circuit by resistors 87 and 88 as well as to the input circuit of an output amplifier 90. The output circuit of the amplifier 90 is coupled with the voltage controlled oscillator as well as to the "Hi-Lo" switch as indicated in FIG. 1. The output circuit of the inverting amplifier 81 is coupled with an "up-down" circuit which in the specific embodiment is shown as the Schmitt trigger circuit 91.

The arrangement is such that the inverting amplifier 81 and its associated feedback circuits acts as an absolute value amplifier and provides to the output amplifier 90 a signal proportional to the absolute value of the signals received from the difference amplifier 32. As a result the frequency of the output signal from the voltage controlled oscillator 34 increases whenever the output signals from the thermocouples 25 and 26 are not the same and regardless of which of the two signals is greater. The Schmitt trigger circuit 91 applies the necessary algebraic sign to the various parts which respond to the signals of the voltage controlled oscillator.

It should be noted that the input circuit 10 for the system is directly coupled with the range amplifier 11 and that the range amplifier 11 is in turn directly coupled with the variable gain amplifier 22. The system operation is based upon the heating effect of a current applied to the thermocouple 24 with system calibration being achieved through the use of a DC standard 28. Thus it will be seen that the system not only provides a digital indication of the R.M.S. value of an AC signal applied to the input, but also operates as an accurate direct current digital voltmeter.

There has been disclosed an improved error detection and amplifier adjustment circuit as embodied in an R.M.S. meter.

What I claim is:

1. A digitalized gain control circuit comprising:

means for producing an error signal whose amplitude and polarity are indicative of the amount and polarity of change of gain required;

variable controlled oscillator means responsive to said error signal to vary its output frequency in accordance with the expression:

$$f_{vco}=f(E)$$

where $f_{vco}$ is the frequency of the output of the variable controlled oscillator, where $E$ is the error signal, and where $f(E)$ increases as $E$ increases in a predetermined manner;

bidirectional counter means responsive to output pulses from said variable controlled oscillator means and to said error signal $E$ to count in a direction determined by the polarity of said error signal.

2. A digitalized gain control circuit comprising: variable controlled oscillator means; means responsive to a sample signal and to a reference signal for determining an error voltage whose magnitude and polarity are proportional, respectively, to the absolute difference and the relative magnitudes between said sample signal and said reference signal; bidirectional counter means having a plurality of stages and responsive to the output of said variable controlled oscillator means to count, and further responsive to the polarity of said error voltage for determining the direction of said count; said variable controlled oscillator means constructed to have its output frequency vary as a function of said error signal; each stage of said bidirectional counter constructed to selectively produce one of a first and second output voltage, in accordance with the count contained in the stage; and means responsive to the count contained in said bidirectional counter means to produce an output signal whose magnitude and polarity are representative of the count in said bidirectional counter means.

3. A digitalized gain control circuit in accordance with claim 1 comprising: means responsive to the count contained in said bidirectional counter means to produce an output signal whose magnitude and polarity are representative of the count in said bidirectional counter means.

4. A digitalized gain control system comprising in combination: signal comparison means responsive to an input signal and a standard signal to provide an error signal representative of the difference between said input and said standard signal; a variable frequency oscillator having an input and an output circuit; a bidirectional counter coupled with the output circuit of said oscillator; and circuit means connecting said comparison means with said oscillator and with said counter, said counter operating to count up or count down in response to signals from said oscillator depending on which of said input and standard signals is the largest, and said oscillator having an output frequency which is controlled by the magnitude of said error signal.

5. A system as defined in claim 4 including a variable gain amplifier having an output circuit coupled with said signal comparison means and controlling said input signal to said comparison means, and gain control circuit means connected to said counter and to said amplifier and operative to control the gain of said amplifier in accordance with the count in said counter.

PO-1050 (5/69)

UNITED STATES PATENT OFFICE
CERTIFICATE OF CORRECTION

Patent No. 3,593,176 Dated July 13, 1971

Inventor(s) Richard W. VanSaun

It is certified that error appears in the above-identified patent and that said Letters Patent are hereby corrected as shown below:

In Column 2, line 73, "(i.e. $f_{vco}$=Bf(E)" should read -- (i.e. $f_{vco}$=f(E) --.

In Column 5, line 8, '"10.99"b' should read -- "10.99"--.

Signed and sealed this 11th day of January 1972.

(SEAL)
Attest:

EDWARD M.FLETCHER,JR.
Attesting Officer

ROBERT GOTTSCHALK
Acting Commissioner of Patents